(12) United States Patent
Bordow et al.

(10) Patent No.: US 12,223,544 B1
(45) Date of Patent: Feb. 11, 2025

(54) SYSTEMS AND METHODS FOR VALUING AN INTEREST RATE SWAP TRANSACTION

(71) Applicant: Wells Fargo Bank, N.A., San Francisco, CA (US)

(72) Inventors: Peter Bordow, Fountain Hills, AZ (US); Fernando Cela Diaz, New York, NY (US); Bernhard Hientzsch, Flushing, NY (US); Zhiqiu Li, Charlotte, NC (US); Vanio Markov, Ridgewood, NJ (US); Abhijit Rao, Irvine, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 299 days.

(21) Appl. No.: 17/651,260

(22) Filed: Feb. 16, 2022

Related U.S. Application Data

(60) Provisional application No. 63/149,967, filed on Feb. 16, 2021.

(51) Int. Cl.
*G06Q 40/04* (2012.01)
*G06Q 40/02* (2023.01)
(52) U.S. Cl.
CPC ............. *G06Q 40/04* (2013.01); *G06Q 40/02* (2013.01)
(58) Field of Classification Search
CPC ................................ G06Q 40/04; G06Q 40/02
See application file for complete search history.

(56) References Cited

U.S. PATENT DOCUMENTS

| | | | | |
|---|---|---|---|---|
| 11,386,486 | B1* | 7/2022 | Rogerson | G06Q 40/02 |
| 2021/0056635 | A1* | 2/2021 | Rogerson | G06Q 40/02 |

OTHER PUBLICATIONS

Haynes, Richard, Madison Lau, and Bruce Tuckman. "How Customized Are Interest Rate Swaps" (Year: 2020).*
Jamal S. Rahhal, Dia I. Abu-Al-Nadi and Mohammed Hawa. Evolutionary Computation in Coded Communications: an Implementation of Viterbi Algorithm. Published Oct. 1, 2009; DOI: 10.5772/9606. URL https://www.intechopen.com/books/evolutionary-computation/evolutionary-computation-in-coded-communications-an-implementation-of-viterbi-algorithm.
Jon R. Rice and David A Meyer. A Quantum Algorithm for Viterbi Decoding of Classical Convolutional Codes. Dated Jun. 23, 2015. URL https://arxiv.org/pdf/1405.7479.pdf.

(Continued)

*Primary Examiner* — Elda G Milef
(74) *Attorney, Agent, or Firm* — K&L Gates LLP

(57) ABSTRACT

A method for valuing one or more cash flow occurrences in an interest rate swap transaction. An example method includes estimating a mean interest rate for each tenor of one or more combinations of two or more tenors of an interest rate swap. The method may include determining a forward interest rate based on the mean interest rate of each tenor of the one or more combinations for the cash flow occurrences. The method may include determining an estimate value, a standard deviation of the estimate value, and a probability or outcome associated with the estimate value. The method may include determining an overall value of the interest rate swap based on one or more determinations of estimate value, standard deviation of the estimate value, and probability or outcome associated with the estimate value.

20 Claims, 8 Drawing Sheets

(56) References Cited

OTHER PUBLICATIONS

Grover, L.K. (1996) A fast quantum mechanical algorithm for database search. In Proceedings of 28th Annual ACM Symposium on Theory of Computing, pp. 212-219. New York, NY:ACM Press. URL http://arxiv.org/abs/quant-ph/0208112.

Grover, L.K. & Rudolph T. (2002) Creating superpositions that correspond to efficiently integrable probability distributions. URL http://arXiv.org/abs/quant-ph/9511026.

Kitaev, A. Yu. (1995) Quantum measurements and the Abelian stabilizer problem. Available at Los Alamos e-Print archive as URL http://arXiv.org/abs/quant-ph/9511026.

Brassard, G., & Høyer (1997) An exact quantum polynomialtime algorithm for Simon's problem. Proceedings of Fifth Israeli Symposium on Theory of Computing and Systems, pp. 12-23, IEEE Computer Society Press. URL https://arxiv.org/abs/quant-ph/9704027.

Brassard, G., Dupuis, F., Gambs, S. & Tapp, A. (2011) An optimal quantum algorithm to approximate the mean and its application for approximating the median of a set of points over an arbitrary distance. URL https://arxiv.org/abs/1106.4267.

Woerner, S., Egger, D. (2019) Quantum Risk Analysis. npj Quantum Information, vol. 5, 12 2019. URL https://arxiv.org/abs/1806.06893.

Montanaro, A. (2017) Quantum speedup of Monte Carlo methods. URL https://arxiv.org/pdf/1504.06987.pdf.

Huber, M. (2014) Improving Monte Carlo randomized approximation schemes. Springer. URL https://arxiv.org/abs/1411.4074.

Grover L.K. (1998) A framework for fast quantum mechanical algorithms, In Proceedings of the 30th ACM Symposium on Theory of Computing: STOC'98, pp. 53-62. URL https://arxiv.org/abs/quant-ph/9711043.

Ilmanen, A. (1995), Time-Varying Expected Returns in International Bond Markets. The Journal of Finance, 50: 481-506. doi:10.1111/j.1540-6261.1995.tb04792.x.

Mamon, R. (2004). Three Ways to Solve for Bond Prices in the Vasicek Model. Journal of Applied Mathematics and Decision Sciences. 8. doi:10.1155/S117391260400001X. URL https://downloads.hindawi.com/archive/2004/131526.pdf.

Brassard, G., Høyer, P., Mosca, M. & Tapp, A. (2002) Quantum amplitude amplification and estimation. Contemporary Mathematics, vol. 305, pp. 53-74. URL https://arxiv.org/abs/quant-ph/0005055.

Kazuya Kaneko, Koichi Miyamoto, Naoyuki Takeda and Kazuyoshi Yoshino. Quantum Speedup of Monte Carlo Integration with respect to the Number of Dimensions and its Application to Finance. Quantum Inf Process 20, 185 (2021) URL https://arxiv.org/abs/2011.02165.

\* cited by examiner

SYSTEMS AND METHODS FOR VALUING AN INTEREST RATE SWAP TRANSACTION

CROSS-REFERENCE TO RELATED APPLICATIONS

This application claims the benefit of U.S. Provisional Patent Application No. 63/149,967, filed Feb. 16, 2021, the entire contents of which are incorporated herein by reference.

TECHNOLOGICAL FIELD

Example embodiments of the present disclosure relate generally to valuing an interest rate swap transaction and, more particularly, to systems and methods for valuing one or more cash flow occurrences in an interest swap transaction based on an interest rate model and a cash flow model.

BACKGROUND

An interest rate swap contract or transaction is an agreement between two parties to exchange a series of cash flows in the future according to pre-specified terms. The underlying assets of the contract are interest rates. There are two common types of interest rate swaps. One is a fixed rate for a float rate swap and the second is a basis swap. The fixed rate for float rate swap includes one party exchanging a fixed percentage contract with a contract indexed to a floating rate, such as London Inter-Bank Offered Rate (LIBOR) or overnight indexed swap (OIS). In such cases, one party may pay a fixed interest payment, while the other pays a fixed interest rate against a floating interest rate. Due to floating rates, it is difficult to determine value from either perspective, e.g., floating rate versus fixed rate.

BRIEF SUMMARY

Accordingly, Applicant has recognized a need for systems and methods to value or for valuing an interest rate swap transaction. Such systems and methods may utilize a combination of statistical analysis using a hybrid computing approach, e.g., using a classic computer and/or quantum computer, to ensure prompt and accurate predictions and estimations, thus resulting in an accurate valuation of an interest rate swap. The value of different combinations of different tenors of the interest rate swap transaction are analyzed by utilizing equations representing value or fair value. Different interest rates of the equation may be estimated or determined using the models (e.g., machine learning models and/or statistical models) generated via the hybrid approach noted above. Finally, the overall value of a particular interest rate swap may be determined based on analysis of the different combinations of the different tenors and the estimations and/or determinations made in regards to different aspects of the interest rate swap.

Systems, apparatuses, methods, and computer program products are disclosed herein for valuing an interest rate swap. The analysis of the interest rate swap transaction utilizing the described hybrid approach (e.g., the use of quantum computers and, in some examples, classical computers) may allow for fast analysis. Further, and as illustrated in FIG. 7 and FIG. 8, such analysis may allow for a high confidence prediction (e.g., see chart 702 in FIG. 7) or value with a low estimate error rate at a low sample number (e.g., see chart 802 in FIG. 8), as compared to traditional analysis. In such an analysis, the hybrid computing model may first estimate a mean interest for each tenor combination to be analyzed. A varying number of combinations or samples may be considered. Once the mean interest has been estimated, the forward interest rate for each combination may be determined, followed by the estimate of each value for each combination. Based on such analysis, the overall value may be determined with a high degree of confidence and accuracy.

In one example embodiment, a method is provided for valuing one or more cash flow occurrences in an interest rate swap transaction. The method may include estimating, by an interest rate swap (IRS) circuitry using an interest rate model, a mean interest rate for each tenor of one or more combinations of two or more tenors of an interest rate swap based on (a) each tenor's long term interest rate mean value, (b) each tenor's interest rate volatility represented by at least one underlying distribution, and (c) a selected number of qubits for the distribution. The method may include determining, by the IRS circuitry, a forward interest rate based on the mean interest rate of each tenor of the one or more combinations for the cash flow occurrences. The method may include determining, by the IRS circuitry using a cash flow model, an estimate value, a standard deviation of the estimate value, and a probability or outcome associated with the estimate value based on (a) the estimate mean interest rate for each tenor of one of the one or more combinations, (b) the forward interest rate of the one or more combinations, and (c) another selected number of qubits. The method may finally include determining, by the IRS circuitry, an overall value of the interest rate swap based on one or more determinations of estimate value, standard deviation of the estimate value, and probability or outcome associated with the estimate value corresponding to each of the one or more combinations.

In an embodiment, the interest rate model and the cash flow model may each comprise a plurality of simulation techniques. One or more of the plurality of simulation techniques generates the overall value using a quantum computer. In another embodiment, the one or more of the plurality of simulation techniques includes a Monte Carlo simulation. In another embodiment, the plurality of simulation techniques may be executed on one or more of a quantum computer or a classical computer.

In another embodiment, the method may include receiving, by an input-output circuitry, parameters for the plurality of simulation techniques, wherein the parameters include a selection of a type of computer. The method may further include prior to estimation of the mean interest rate, transmitting the parameters to the selection, wherein estimations and determinations by the IRS circuitry are executed on the selection of the type of computer. In such embodiments, the type of computer includes one or more of a combination of the quantum computer and the classical computer. The parameters may include one or more of a type of distribution, a number of periods, a number of qubits, a type of measurement, or q shots. The estimations and determinations by the IRS circuitry are initiated by one of user input or upon reception of the parameters. The method may also include generating, by the input-output circuitry, a user interface configured to accept the parameters and initiate the estimations and determinations by the IRS circuitry.

In an embodiment, the interest rate model and the cash flow model may comprise one or more of a machine learning or statistical model.

In another embodiment, the method may include generating, by the IRS circuitry, an output file in a readable format including one or more of the overall value of (1) the interest rate swap, (2) the one or more determinations of estimate value, (3) standard deviation of the estimate value, and (4) probability or outcome associated with the estimate value corresponding to each of the one or more combination.

In one example embodiment, an apparatus for valuing one or more cash flow occurrences in an interest rate swap transaction is provided. The apparatus may include an interest rate swap (IRS) circuitry. The IRS circuitry may be configured to estimate, using an interest rate model, a mean interest rate for each tenor of one or more combinations of two or more tenors of an interest rate swap based on (a) each tenor's long term interest rate mean value, (b) each tenor's interest rate volatility represented by at least one underlying distribution, and (c) a selected number of qubits for the distribution. The IRS circuitry may be configured to determine a forward interest rate based on the mean interest rate of each tenor of the one or more combinations for the cash flow occurrences. The IRS circuitry may be configured to determine, using a cash flow model, an estimate value, a standard deviation of the estimate value, and a probability or outcome associated with the estimate value based on (a) the estimate mean interest rate for each tenor of one of the one or more combinations, (b) the forward interest rate of the one or more combinations, and (c) another selected number of qubits. The IRS circuitry determine an overall value of the interest rate swap based on one or more determinations of estimate value, standard deviation of the estimate value, and probability or outcome associated with the estimate value associated with each of the one or more combinations.

In one example embodiment, a computer program product for valuing one or more cash flow occurrences in an interest rate swap transaction is provided. The computer program product may comprise at least one non-transitory computer-readable storage medium storing software instructions that, when executed, cause an apparatus to perform an action or function. The software instructions, when executed, may estimate a mean interest rate for each tenor of one or more combinations of two or more tenors of an interest rate swap based on (a) each tenor's long term interest rate mean value, (b) each tenor's interest rate volatility represented by at least one underlying distribution, and (c) a selected number of qubits for the distribution. The software instructions, when executed, may determine a forward interest rate based on the mean interest rate of each tenor of the one or more combinations for the cash flow occurrences. The software instructions, when executed, may determine, using a cash flow model, an estimate value, a standard deviation of the estimate value, and a probability or outcome associated with the estimate value based on (a) the estimate mean interest rate for each tenor of one of the one or more combinations, (b) the forward interest rate of the one or more combinations, and (c) another selected number of qubits. The software instructions, when executed, may determine an overall value of the interest rate swap based on one or more determinations of estimate value, standard deviation of the estimate value, and probability or outcome associated with the estimate value associated with each of the one or more combinations.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
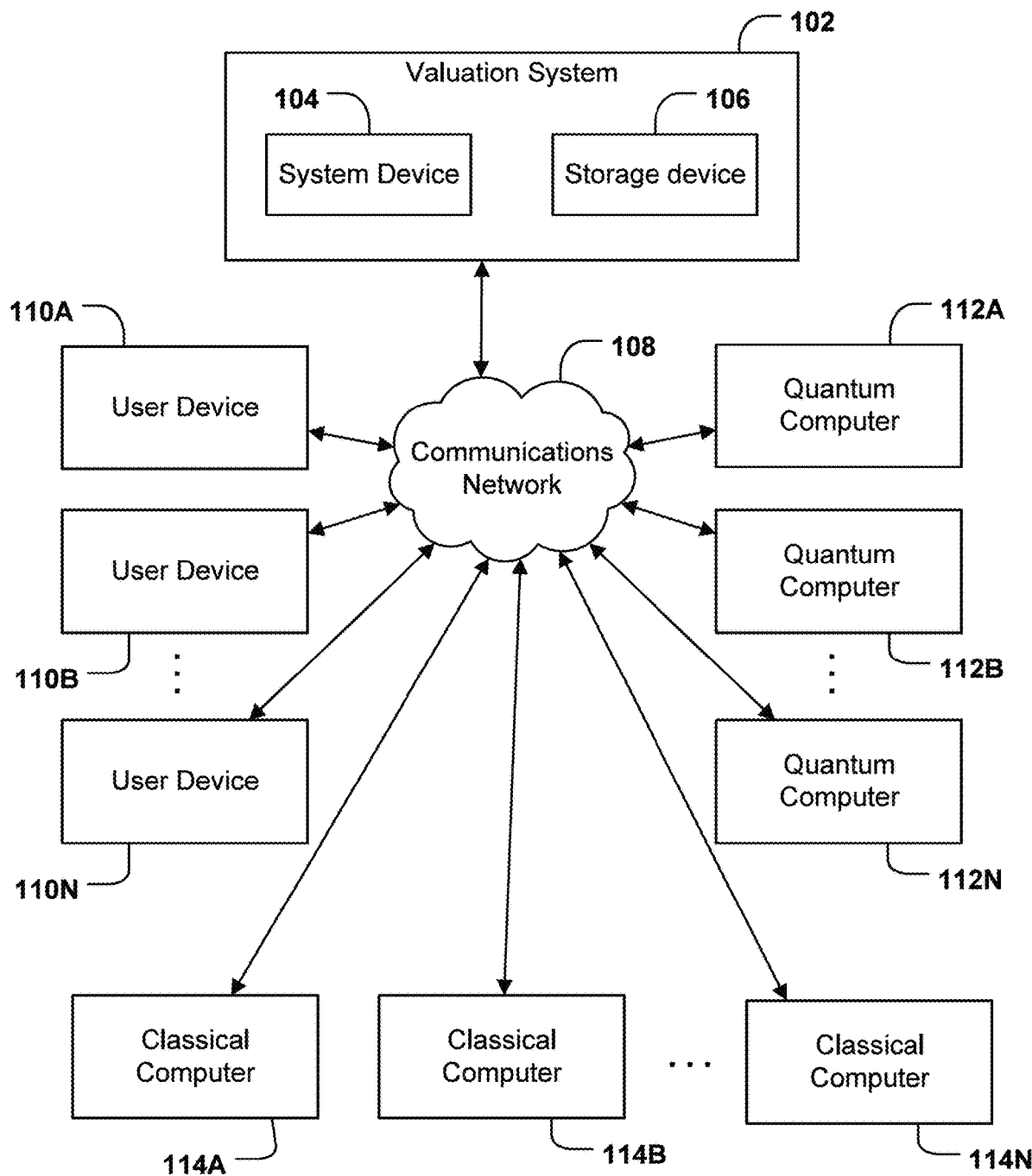
FIG. 1 illustrates a system in which some example embodiments may be used.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

As used herein, a "processor" or "processing circuitry" may include, for example one processor or multiple processors included in a single device or distributed across multiple computing devices. The processor 1002 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, a "tenor" may include a point in time of an interest rate swap transaction. An interest rate swap transaction may include a plurality of tenors. Each tenor may include a variable interest rate. A combination of tenors may include at least one forward interest rate.

The terms "classical computing", "classical computer", "classical computing device", and "classical computing system" are used to refer to a binary computing device or device. A classical computer may execute functions or operations in a deterministic and logical way.

The terms "quantum computing", "quantum computer", "quantum computing device", "quantum computing system", and "quantum annealer" are used to refer to a computing device or device utilizing quantum bits (which may also be referred to as qubits).

The terms "quantum bit" and "qubit" both refer to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state |1> and the spin down state |0>); the energy level of a single atom (e.g., a superconducting qubit); or any other suitable qubit. A quantum bit may exhibit quantum superposition of multiple states, unlike a classical bit, which is either a 0 or a 1. The superposition of a qubit's states is a feature of quantum mechanics, and enables certain calculations to be performed probabilistically in parallel and at a faster rate by a quantum computer than is possible by a classical computer.

Overview

As noted above, methods, apparatuses, systems, and computer program products are described herein that provide for fast and accurate estimation of the value of an interest rate swap. Traditionally, such valuations, using classical computers, may take time, require large sample sets, and include large error rates especially with smaller sample sizes. In addition, with the large amount of interest rate swaps being considered on a daily basis, accuracy and timeliness are critical.

In contrast to these conventional techniques for interest rate swap valuation, the present disclosure describes the use of a hybrid type computing device (e.g., a classical computer and quantum computer) analysis. Various portions of the analysis may occur using both a classical computing device and a quantum device. The mean interest may be determined or estimated via quantum computing and/or a typical computing device. Utilizing the estimated mean interest of a combination of tenors, the forward interest rate may be determined. Based on the forward interest rate and mean interest rate, a value may be determined for the combination of tenors. Finally, based on multiple analyses of different combination of two or more tenors, the overall valuation may be determined. Different approaches to determine the overall value may be utilized, such as, but not limited to, a binomial lattice model, a time-discretized stochastic differential equation, and/or Markov chains (hidden or otherwise).

Accordingly, the present disclosure sets forth systems, methods, and apparatuses that promptly and accurately value an interest rate swap transaction. There are many advantages of these and other embodiments described herein. For instance, the use of quantum computing significantly shortens the time-frame of the valuations. The use of a hybrid approach offers the benefits of quantum computing but with a classical computing device providing a lower cost second source of authority. Using such a model allows for many valuations to occur in a short amount of time. Finally, the use of quantum computing ensures a low error rate, particularly at lower sample rates.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which embodiments of the present disclosure may operate. As illustrated, a valuation system 102 may include a system device 104 in communication with a storage device 106. Although system device 104 and storage device 106 are described in singular form, some embodiments may utilize more than one system device 104 and/or more than one storage device 106. Additionally, some embodiments of the valuation system 102 may not require a storage device 106 at all. Whatever the implementation, the valuation system 102, and its constituent system device(s) 104 and/or storage device(s) 106 may receive and/or transmit information via communications network 108 (e.g., the Internet) with any number of other devices, such as one or more of user device 110A, user device 110B, through user device 110N, quantum computer 112A, quantum computer 112B, through quantum computer 112N, classical computer 114A, classical computer 114B, and/or through classical computer 114N.

System device 104 may be implemented as one or more servers, which may or may not be physically proximate to other components of valuation system 102. Furthermore, some components of system device 104 may be physically proximate to the other components of valuation system 102 while other components are not. System device 104 may receive, process, generate, and transmit data, signals, and electronic information to facilitate the operations of the valuation system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the valuation system 102. Storage device 106 may store information relied upon during operation of the valuation system 102, such as tenors for a particular interest rate swap, parameters for a particular valuation of an interest rate swap, each tenor's interest rate volatility represented by at least on underlying distribution, a number of qubits for the distribution, and/or other data or information that may be used by the valuation system 102, data and documents to be analyzed using the valuation system 102, or the like. In addition, storage device 106 may store control signals, device characteristics, and access credentials enabling interaction between the valuation system 102 and one or more of the user devices 110A-110N, quantum computers 112A-112N, or classical computers 114A-114N.

The one or more user devices 110A-110N and/or the one or more classical computers 114A-114N may be embodied by any computing devices known in the art, such as desktop or laptop computers, tablet devices, smartphones, or the like. Finally, the one or more quantum computers 112A-112N may be embodied by any quantum computing device known in the art. One or more of the one or more quantum computers 112A-112N may be embodied by a quantum annealer. The one or more user devices 110A-110N, the one or more quantum computers 112A-112N, and the one or more classical computers 114A-114N need not themselves be independent devices, but may be peripheral devices communicatively coupled to other computing devices.

Although FIG. 1 illustrates an environment and implementation of the present disclosure in which the valuation system 102 interacts with one or more of user devices 110A-110N, quantum computers 112A-112N, or classical computers 114A-114N. In some embodiments one or more of the users or agents may directly interact with the valuation system 102 (e.g., via input/output circuitry of system device 104), in which case a separate device may not need to be utilized for such users or agents. Whether by way of direct interaction or interaction via a separate device, users and agents may communicate with, operate, control, modify, or otherwise interact with the valuation system 102 to perform functions described herein and/or achieve benefits as set forth in connection with this disclosure.

Example Implementing Apparatuses

Figure 2:
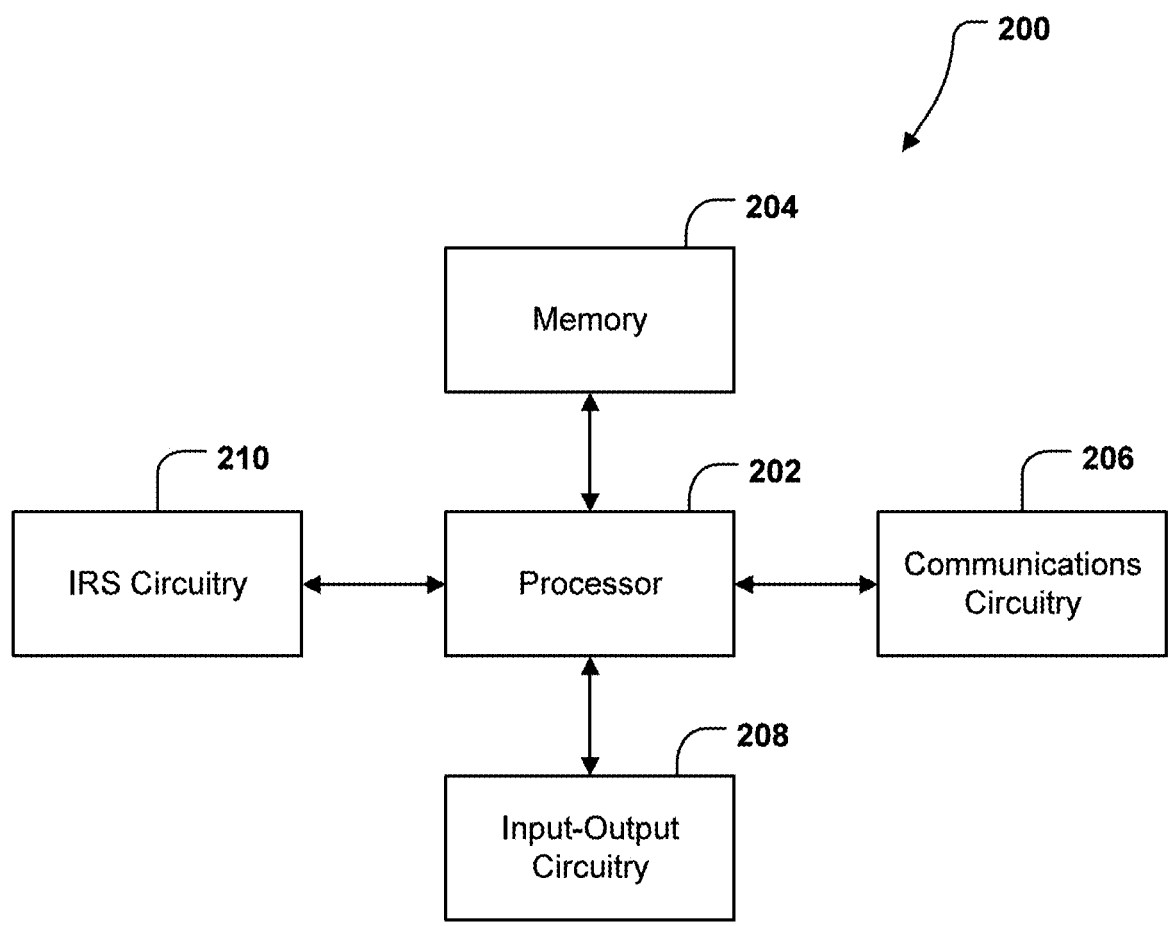
FIG. 2 illustrates a schematic block diagram of example circuitry embodying a device that may perform various operations in accordance with some example embodiments described herein.

System device 104 of the valuation system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, and interest rate swap (IRS) circuitry 210, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described herein, such as those described above in connection with FIG. 1 and below in connection with FIGS. 3-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor 202 may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input (e.g., securities or stock requests) may be received via a separate device such as user devices 110A-110N, quantum computers 112A-112N, and/ or classical computers 114A-114N. The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, an image capture device, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises IRS circuitry 210 that, in response to a prompt from a user (e.g., directly or indirectly) or other source, estimates and/or determines an overall value of an interest rate swap. The IRS circuitry 210 may utilize processor 202, memory 204, or any other hardware component included in the apparatus 200 to perform these operations, as described in connection with FIGS. 3-6 below. The IRS circuitry 210 may further utilize communications circuitry 206 to gather data from a variety of sources (e.g., user devices 110A-110N, as shown in FIG. 1, or other devices), may utilize input-output circuitry 208 to receive data from a user, and in some embodiments may utilize processor 202 and/or memory 204 to receive a valuation request and/or perform the determinations and/or predictions regarding such a valuation request. The output of the IRS circuitry 210 may be transmitted to other circuitry of the apparatus 200 (e.g., communications circuitry 206 and/or input-output circuitry 208). In an embodiment, the IRS circuitry 210, may receive the valuation request, each of two or more tenor's long term interest rate mean value, and/or each of two or more tenor's interest rate volatility represented by at least one underlying distribution. The IRS circuitry 210 may additionally receive one or more different parameters associated with operations of models included in the IRS circuitry 210. The IRS circuitry 210, as noted, may include two or more models (e.g., each model being a quantum computer and/or classical computer based model). For example, the IRS circuitry 210 may include an interest rate model and/or a cash flow model. The interest rate model may receive as inputs, (a) each tenor's long term interest rate mean value, (b) each tenor's interest rate volatility represented by at least one underlying distribution, and (c) a selected number of qubits for the distribution. The interest rate model may output a mean interest rate for each tenor of one or more combinations of two or more tenors of an interest rate swap. The cash flow model may receive as inputs, (a) the estimate mean interest rate for each tenor of one of the one or more combinations, (b) the forward interest rate of the one or more combinations, and (c) another selected number of qubits. The cash flow model may output an estimate value, a standard deviation of the estimate value, and/or a probability, outcome, or trigger associated with the estimate value. Each of the models may be either a machine learning model and/or statistical model. Each model may be generated by one or more of a quantum computer and/or classical computer. In another embodiment, either of the models may be executed on one or more of the quantum computer and/or classical computer. While the quantum computer offers faster and more accurate modeling or simulation (e.g., using one or more different simulation techniques) of different scenarios, the compute power of the quantum computer may not be required in every instance. As such, the ISR circuitry 210 may be configured to allow a user or other device to select one or more of a quantum computer or classical computer for a valuation operation. In another embodiment, the IRS circuitry 210 may be configured to automatically select the type of computer utilized based on the parameters received. Further, the IRS circuitry 210 may perform other functions, such as determining a forward interest rate for cash flow occurrences and/or an overall value of the interest rate swap. In an embodiment, the IRS circuitry 210 may initiate such simulations on corresponding quantum computers and/or classical computers based on parameters received via the input-output circuitry 208 or other circuitry.

Although components 202-210 are described in part using functional language, it will be understood that the particular implementations necessarily include the use of particular hardware. It should also be understood that certain of these components 202-210 may include similar or common hardware. For example, the IRS circuitry 210 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the IRS circuitry 210 may leverage processor 202, memory 204, communications circuitry 206, or input-output circuitry 208 as described above, it will be understood that any of these elements of apparatus 200 may include one or more dedicated processors, specially configured field programmable gate arrays (FPGA), or application specific interface circuits (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the IRS circuitry 210 is implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments of the present disclosure are described below in connection with a series of graphical user interfaces and flowcharts.

Graphical User Interface

Figure 3:
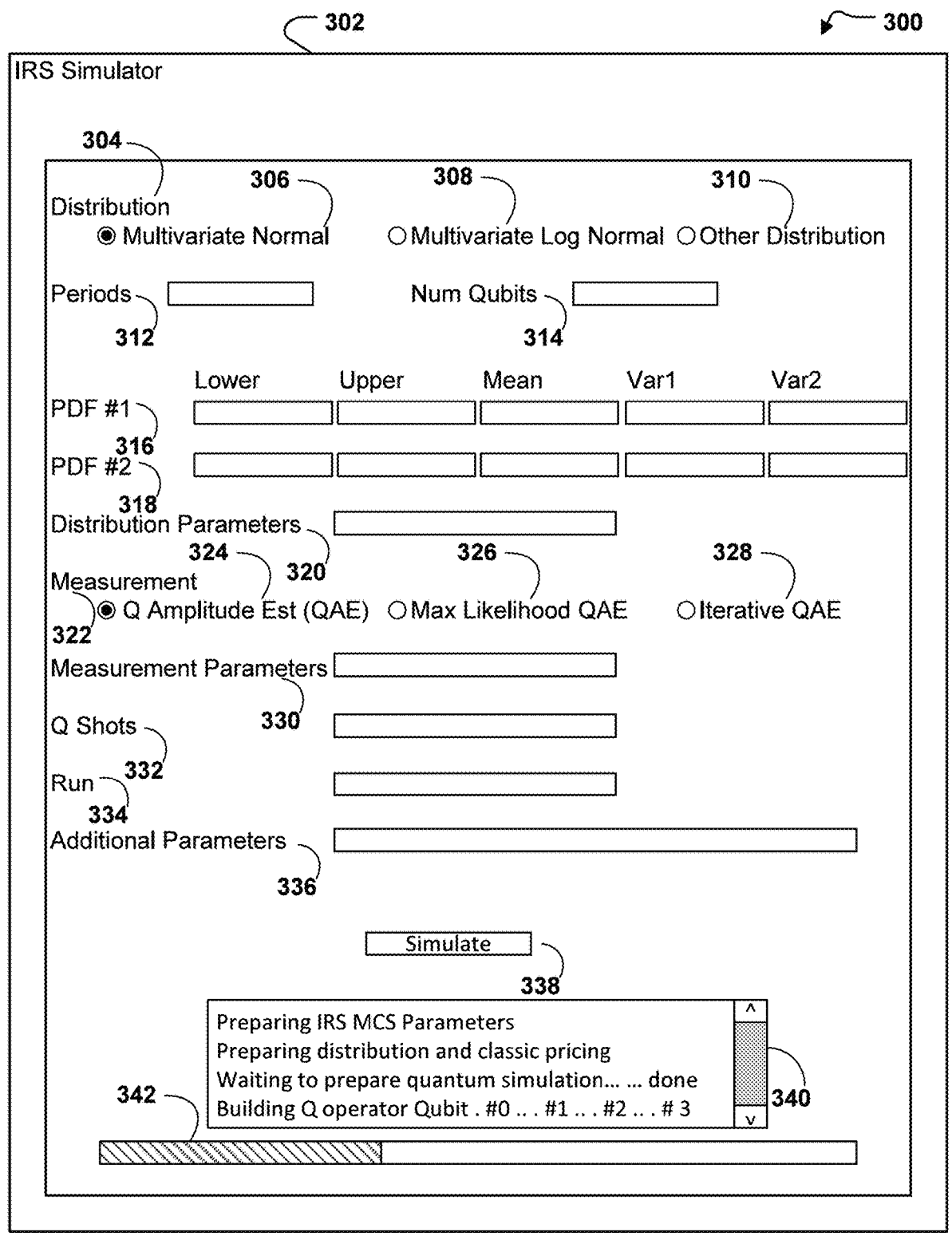
FIG. 3 illustrates a block diagram of graphical user interface to estimate the value of interest rate swap transaction, in accordance with some example embodiments described herein.

Turning to FIG. 3, a graphical user interface (GUI) 300 is provided that illustrates the valuation system 102. As noted previously, a user may interact with the valuation system 100 by directly engaging with input-output circuitry of an apparatus of a valuation system 100. In such an embodiment, the GUI 300 shown in FIG. 3 may be displayed to a user by an apparatus, a display, user devices 110A-110N, a computing device, a laptop, a tablet, a smartphone, or any device including a visual display and input-output connections. Alternatively, a user may interact with the valuation system 102 using a separate apparatus, which may communicate with the valuation system 100 via a communications network, e.g., the internet, an intranet, a virtual private network, a local network, cellular data network, via hardwire, or other type of data connection. In such an embodiment, the GUI 300 shown in FIG. 3 may be displayed to the user by a display of the computing device 102.

The GUI 300 may be considered an interest rate swap (IRS) simulator 302. The IRS simulator 302 may include several options for selection. For example, prior to performing analysis a type of distribution 304 may be selected, e.g., multivariate normal 306, multivariate lognormal 308, and/or other distribution 310. In an embodiment, a dropdown with a list of distributions may be included. In yet another embodiment, an option to select a local distribution via a file search may be included. The period 312 may be entered into a text box. The number of qubits 314 for a particular simulation may be entered into a text box, for example 2 qubits may be selected per tenor. While the GUI 300 shows PDF #1 316 and PDF #2 318 may include a list of text boxes for entry, more or less may be included, and such text boxes may be related to the tenors selected for analysis. Distribution parameters 320 may be added via a textbox. Further, a type of measurement may be selected, e.g., quantum amplitude estimate (QAE) 324, max likelihood QAE 326, and/or iterative QAE, to determine various factors, such as mean interest rate. Measurement parameters 330, q shots 332, run 334, and additional parameters may all include separate textboxes to allow for entry of parameters.

Once a user has selected the appropriate options and entered in parameters, the user may select the simulate button 338. A list of executing commands 340 being executed may populate a box. A bar 342 illustrating the status of execution may fill as the simulation proceeds. As the operation completes, results may be listed in a separate window, may be listed in the same window, may be listed where the list of executing commands 340 populate, and/or may be downloaded as a file or report (e.g., spreadsheet, pdf, etc.). In an embodiment, the file or report (e.g., an output file) may be downloaded in a readable format. Further the file or report may include one or more of the overall value of (1) the interest rate swap, (2) the one or more determinations of estimate value, (3) standard deviation of the estimate value, and (4) probability or outcome associated with the estimate value corresponding to each of the one or more combination. In another embodiment, the report may include a recommendation. The recommendation may indicate a risk associated with executing the simulated interest rate swap. The recommendation may be determined, for example by the valuation system 102 or ISR circuitry, based on one or more of overall value of the interest rate swap, the estimate value, standard deviation of the estimate value, or probability or outcome associated with the estimate value.

Example Operations

Figure 4:
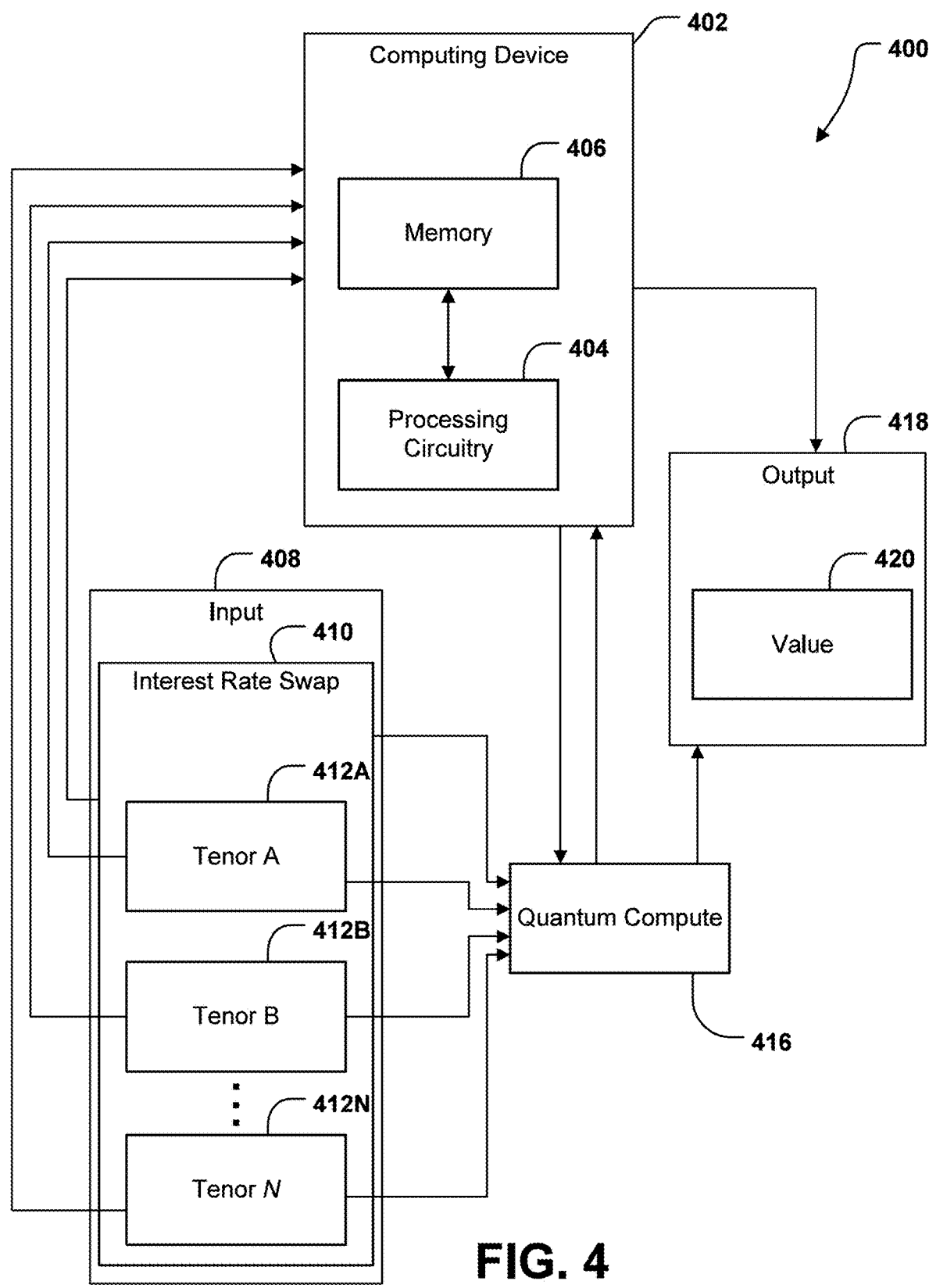
FIG. 4 illustrates a block diagram of an example computing device utilizing data to determine a value, in accordance with some example embodiments herein.

Example embodiments described herein may be implemented using any of a variety of computing devices, servers and/or quantum computers, e.g., such as valuation system 102 and/or apparatus 200. To this end, FIG. 4 illustrates a block diagram of an example computing device 402 utilizing input 408 data to determine a classification or value 420 within which embodiments of the present disclosure may operate. As illustrated, the valuation system 400 may include a computing device 402. The computing device 402 may include a memory 406 and processing circuitry 404, the memory 406 in communication with the processing circuitry 404. The memory 406 may include data and instructions executable by the processing circuitry 404. The computing device 402 may be in communication with quantum compute 416 (e.g., a quantum computer or the like). Quantum compute 416 may include various components to output or determine a classifier, indicator, or value and/or simulate a scenario, as will be described herein. Although computing device 402 and quantum compute 416 are described in singular form, some embodiments may utilize more than one computing device 402 and/or the quantum compute 416. Whatever the implementation, the computing device 402 and the quantum compute 416 may receive and/or transmit information via communications network (e.g., the Internet, an intranet, or via hardwire) with any number of other devices, such as the input 408 and the output 418.

The computing device 402 may be implemented as one or more servers, which may or may not be physically proximate to other components of the valuation system 400. Furthermore, some components of the computing device 402 may be physically proximate to the other components of valuation system 400 while other components are not. The computing device 402 may receive, process, generate, and transmit data, signals, and electronic information to facilitate the operations of the valuation system 400.

The input 408 and/or output 418 may be received from one or more of a computing device or storage device. Data associated with the input 408 or output 418 may be stored on a computing device or storage device. The one or more of the computing device or the storage device may comprise a distinct component from the computing device 402, or may comprise an element of the computing device 402 (e.g., memory 406 or other storage devices). Storage devices (e.g., memory 406) may host the software, firmware, and/or instructions executed to operate the computing device 402. Storage devices may store information relied upon during operation of the computing device 402, such as inputs 408 that may be used by the computing device 402, data and documents to be analyzed using the computing device 402, or the like. In addition, storage devices may store control signals, device characteristics, and access credentials enabling interaction between the computing device 402, quantum compute 416, or other components of the valuation system 400.

The data stored in relation to the input 408 and output 418 may be transmitted to various locations or users. The input 408 may be transmitted to quantum compute 416 and/or the computing device 402. The computing device 402 may, after determining a classification or indication, transfer such data as an element of output 418. The data included with the input may include data related to an interest rate swap 410. In particular, an interest rate swap 410 may include one or more tenors 412. Each tenor 412, e.g., tenor A 412A, tenor B 412B, and up to tenor N 412N, may include data. For example, each tenor 412 may include a long term interest rate mean value, an interest rate volatility represented by at least one underlying distribution, and/or other data related to tenors 412.

Although FIG. 4 illustrates an environment and implementation of the present disclosure in which the computing device 402 receives with an input 408, interacts with quantum compute 416, and produces an output 418, in some embodiments users may directly interact with the valuation system 400 or any component of the valuation system 400 (e.g., via input/output circuitry of any of the components of the valuation system 400, See FIG. 3). Whether by way of direct interaction or via a separate interaction, a user may communicate with, operate, control, modify, or otherwise interact with the valuation system 400 to perform functions described herein and/or achieve benefits as set forth in connection with this disclosure.

Figure 5:
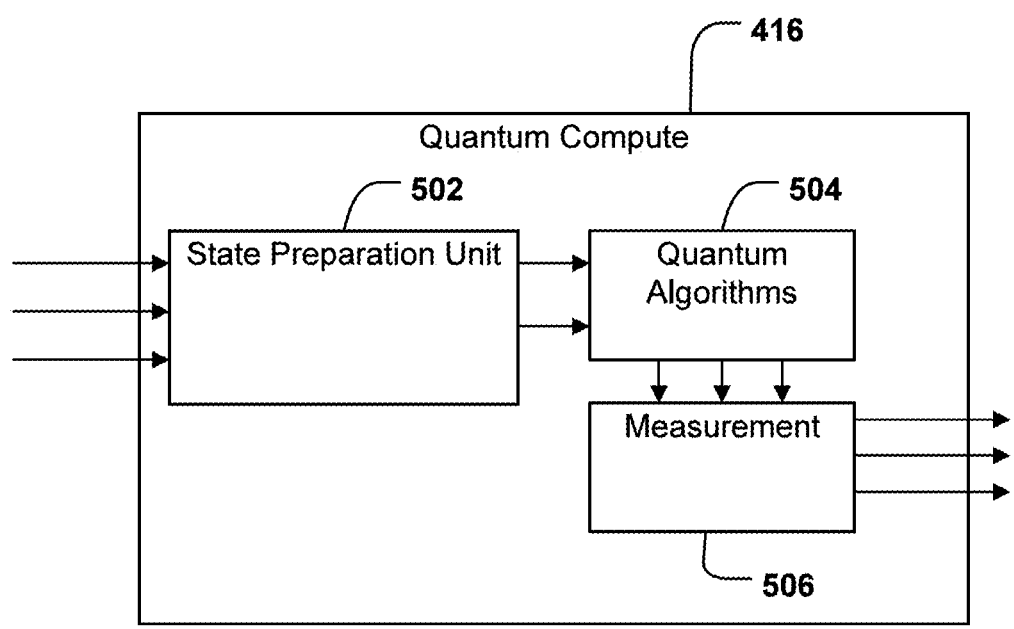
FIG. 5 illustrates a block diagram of example quantum compute that determines a value, in accordance with some example embodiments described herein.

As illustrated in FIG. 5, the quantum compute 416 may include a state preparation unit 502. The state preparation unit 502 may create a quantum superposition. The quantum compute 416 may include different quantum algorithms 504, as describe herein. Utilizing quantum logic gates or other quantum computing methods, quantum compute 516 may generate, e.g., using a measurement block 506, a machine learning model (or classifier) that can predict a probability, outcome, trigger, or value indicating a valuation for the interest rate swap transaction.

Once a classifier or value is generated, an overall value of the interest rate swap transaction may be determined. The overall value may be determined using the computing device 402 and/or quantum compute 416. Various analyses may be utilized to determine such an overall value, e.g., a binomial lattice model, a time-discretized stochastic differential equation, and/or Markov chains (hidden or otherwise).

Figure 6:
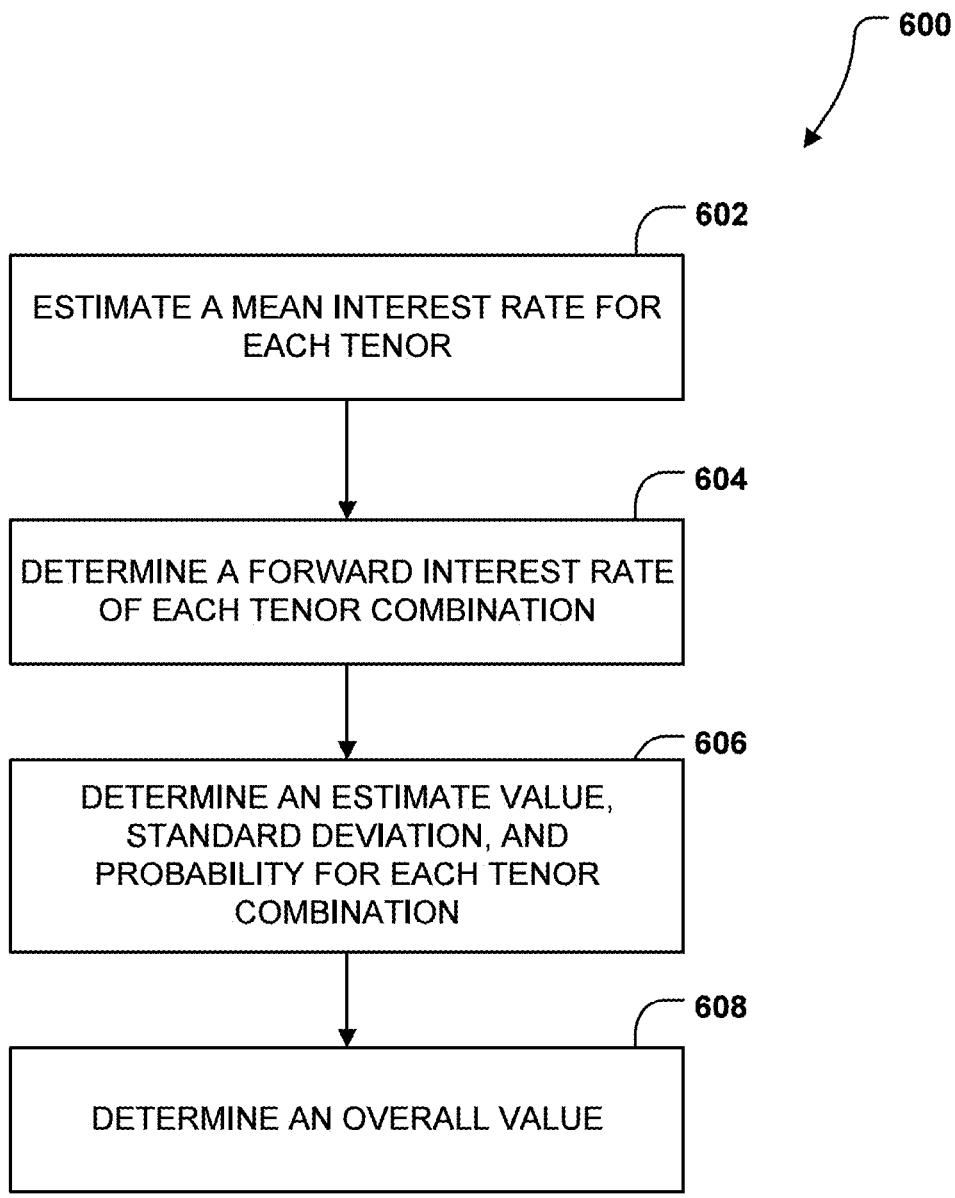
FIG. 6 illustrates an example flowchart for determining an overall value, in accordance with some example embodiments described herein.
Figure 7:
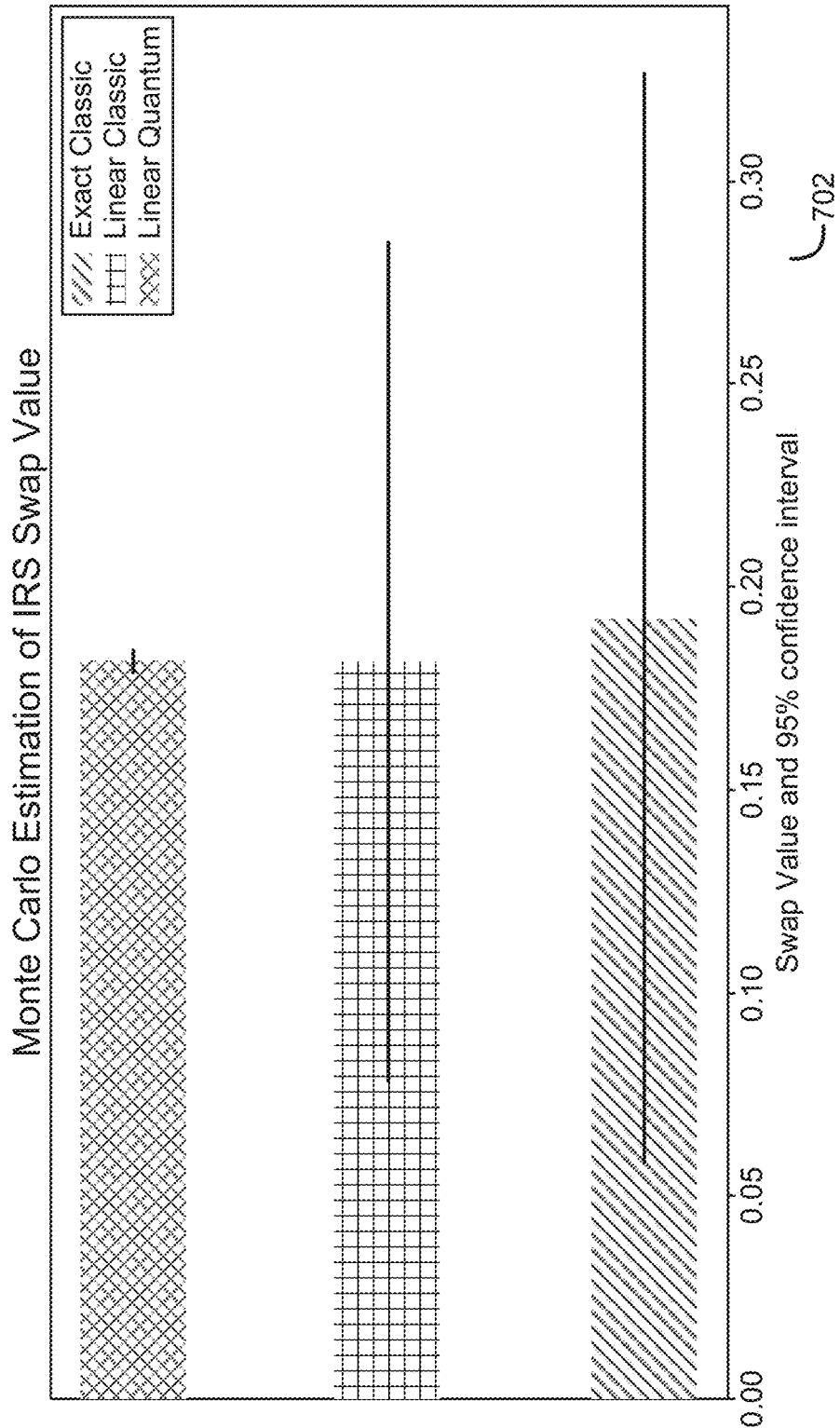
FIG. 7 illustrates an example chart representing an interest rate swap value, in accordance with some example embodiments described herein.
Figure 8:
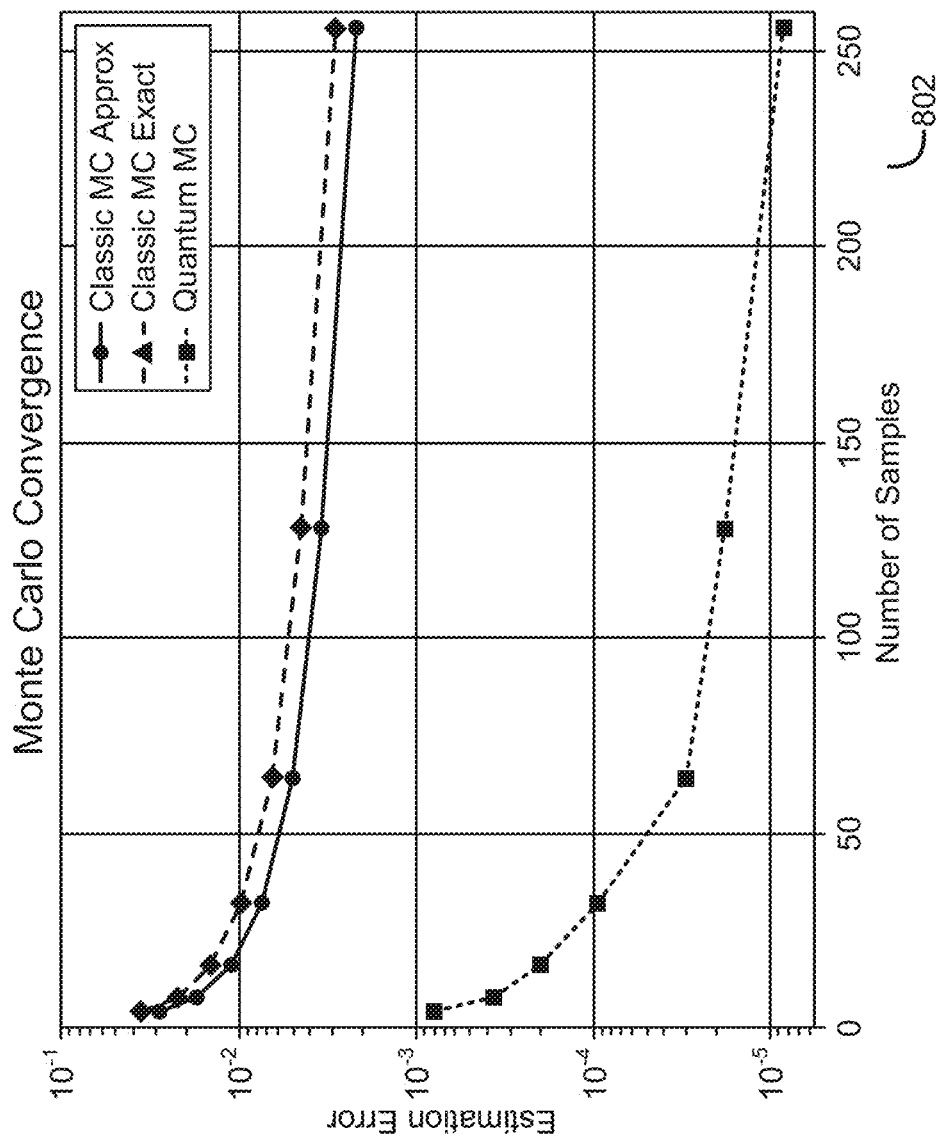
FIG. 8 illustrates an example chart representing error rate per number of samples, in accordance with some example embodiments described herein.

Turning to FIG. 6, an example flowchart 600 is illustrated that contains example operations implemented by example embodiments described herein. The operations illustrated in FIG. 6 may, for example, be performed by system device 104 of the valuation system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, IRS circuitry 210, and/or any combination thereof. It will be understood that user interaction with the valuation system 102 may occur directly via input-output circuitry 208, or may instead be facilitated by a separate user device 110A-110N, as shown in FIG. 1, and which may have similar or equivalent physical componentry facilitating such user interaction.

As shown by operation 602, the apparatus 200 include means, such as IRS circuitry 210, for estimating, for differing combinations of two or more tenors of an interest rate swap or cash flow occurrences, an estimate mean interest rate for each tenor. In other words, for a particular combination of tenors, a quantum computer and/or the classical computer may determine or estimate a mean interest rate. Such an estimation may be performed either wholly or in part by the quantum computer. The estimation may also be performed in the classical computer. The data utilized in such an operation may be either sent directly to the quantum computer or sent to the quantum computer indirectly, e.g., through the classical computer or user devices. As the sample rate increases for an interest rate, the interest rate may move towards the mean of such an interest rate. The mean interest rate may be determined based on each tenor's long term interest rate mean value, each tenor's interest rate volatility (which may be represented by at least one underlying distribution), and/or a selected number of qubits.

As shown by operation 604, a forward interest rate for each tenor combination may be determined. Similar to the mean interest rate, the quantum compute 116 module and/or the computing device 102, may perform such determinations. Further, the forward interest rate may be determined as a function of or based on the estimated mean interest rates for that particular combination.

As shown by operation 606, the apparatus 200 include means, such as IRS circuitry 210, to determine an estimate a value of each combination of tenors. Similar to the mean interest rate and forward interest rate, the quantum computer and/or the classical computer, may perform such determinations. In addition to the estimate value, a standard deviation of the estimate value and a probability or outcome associated with the estimate value may be determined. Such determinations may be based on the estimate mean interest of the tenors in a combination, the forward interest rate, and another selected number of qubits. Such determinations may be performed using the quantum computer and/or the classical computer.

As shown by operation 608, the apparatus 200 include means, such as IRS circuitry 210, to determine the overall value of the interest rate swap transaction. Such determinations may be performed using the quantum computer and/or the classical computer. Such determinations may be based on one or more determinations of estimate value, standard deviation of the estimate value, and/or probability or outcome associated with the estimate value associated with each of the one or more combinations. Such determinations may be accomplished using a binomial lattice model, a time-discretized stochastic differential equation, and/or Markov chains (hidden or otherwise).

For example, an operation, as described by method 600 may utilize a classical computer and/or a quantum computer. If a classical computer is utilized, in a non-limiting example, the classical computer may execute a model to determine the estimated value of an IRS for two or more tenors. In such examples, the value of the IRS may be the difference between the fixed and floating discounted cash flow, as shown in equation 1:

$$V(T_0) = \sum_{i=1}^{n} \frac{c}{(1+r_i)^i} - \sum_{i=1}^{n} \frac{f_{i-1,i}}{(1+r_i)^i} = \sum_{i=1}^{n} \frac{C - f_{i-1,i}}{(1+r_i)^i} \quad \text{(Equation 1)}$$

As such, the value for a two tenor swap may be represented by equation 2:

$$V = \frac{(c - r_1)}{(1 + r_1)} + \frac{c - f_{12}}{(1 + r_2)^2} \quad \text{(Equation 2)}$$

Risk associated with the IRS may be due to fixed payment cash flow having a coupon 'c' that could differ from the future market interest rates $r_1, r_2, f_{12}$. The future interest rate may be derived from or approximated as equation 3, for example, in operation 604.

$$f_{m,n} \approx \frac{(n \ast r_n - m \ast r_m)}{(n - m)} \quad \text{(Equation 3)}$$

For, at least, the two tenor swap, such an approximation may be:

$$f_{12} \approx r_2 + (r_2 - r_1) \quad \text{(Equation 4)}$$

One approach to model the interest rate r may be to use a one-factor stochastic mean reversion process describing a time evolution, further defined as being normally distributed with a mean and a variance.

The Asset Pricing Theory (see equation 2) may suggest that the price of a derivative security can be represented as an expected value. Equations 1 (above) and 5 (below) illustrate that the valuation of a derivative security can be performed by estimation of the mean of a function of random arguments (e.g., a Monte Carlo Method), for example, to measure the mean interest rate or r at operation 602 (also see equation 7.

$$r_t \sim N(\mu_t, \sigma_t^2) \quad \text{(Equation 5)}$$

While a Monte Carlo method is described, it will be understood that other statistical models may be utilized to estimate or determine the value of an IRS. A Monte Carlo method may include sampling from a universe of possible outcomes and calculating a fraction of samples belonging to the estimated set. As will be understood by a person skilled in the art, the error on a Monte Carlo computation is proportional to equation 6.

$$\sigma/\sqrt{n} \quad \text{(Equation 6)}$$

One method to model an interest rate may include a one-factor stochastic mean reversion process describing a time evolution:

$$dr_t = k(\theta - r_t)dt + \sigma r_t^\gamma dz_t \quad \text{(Equation 7)}$$

Using the equations described above, the estimated value (see equation 8) of the IRS transaction may be determined, as well as a standard deviation (see equation 9) and a probability, outcome, confidence level, or error rate (e.g., a precision error and/or confidence error, see equation 10 and equation 11, respectively) associated with each of the one or more combinations. Such equations may be utilized in operations 606 and 608.

$$\hat{V}_n = \hat{V}_n + V_i \quad \text{(Equation 8)}$$

$$\sigma_f = \sqrt{\frac{1}{n-1}\sum_{i=1}^{n}(f(x_i) - \hat{f}_n)^2} \quad \text{(Equation 9)}$$

$$P(\text{value is in } (x_i - \varepsilon, x_i + \varepsilon)) \geq \frac{\beta}{100} \quad \text{(Equation 10)}$$

$$\frac{\sigma^2}{n \ast \varepsilon^2} = 1 - \frac{\beta}{100} \quad \text{(Equation 11)}$$

$$f:\{0, \ldots, N-1\} \to [0, 1] \quad \text{(Equation 12)}$$

For a quantum computer or quantum circuit the quantum equivalent of the equations described above may be utilized. The function f may be defined over the set of states of a quantum register with n qubits (e.g., N=2n states). The codomain of $f$ may be the closed unit interval [0, 1].

The mean of f may be defined by:

$$\hat{f} = \frac{1}{N}\sum_{i=1}^{N}f(i) \quad \text{(Equation 13)}$$

A mean value estimation and amplitude estimation algorithm may be used to estimate $\hat{f}$.

Assuming that the variance of the samples $f_1, f_2, f_3, \ldots$ is at most $\sigma_f^2$, the quantum algorithm estimate E[V] up to an additive error ε using sample of size $$O\left(\frac{\sigma_f}{\varepsilon}\right).$$

E is the Expectation, $E[f(x)] = \hat{f}$.

The quantum estimation algorithm may provide estimate, $\tilde{f}$, of the mean, such that $|\hat{f} - \tilde{f}|$ is less than or equal to ε after $$O\left(\frac{1}{\varepsilon}\log\log\left(\frac{1}{\varepsilon}\right)\right)$$

samples of $f$. A Quantum Amplitude Estimation algorithm may provide a quadratic convergence speedup compared to the classic Monte Carlo. If A is the unitary operator implemented by the algorithm, then A may be applied to a n+1 qubits quantum register initialized with 0-s:

$$A|0\rangle_{n+1} = \alpha|\psi_0\rangle|0\rangle + \beta|\psi_1\rangle|1\rangle$$

where $\alpha = \sqrt{1-\hat{f}}$, $\beta = \sqrt{\hat{f}}$, and $\psi_0, \psi_1$ are n-qubit normalized states. By performing a sequence of measurements on the last qubit of $A|0\rangle_{n+1}$, $\hat{f}$ may be calculated by taking the ratio of measurements of |1⟩ and all measurements. Such calculations may be a simulation of the classic algorithm though, and will converge at rate $$O\left(\frac{1}{\sqrt{N}}\right).$$

The convergence speedup of the quantum amplitude amplification comes from increasing the probability of obtaining state $|\psi_1\rangle|1\rangle$ by applying a specially constructed operator:

$$Q = -AS_0A^{-1}S_1$$

where the unitary operator $S_1$ changes the amplitude sign of the measured state $|\psi_1\psi|1\rangle$ and preserves $|\psi_0\rangle|0\rangle$, while the unitary operator $S_0$ changes the amplitude sign of the zero-state $|0\rangle_{n+1}$ and preserves the other states:

$$S_1|\psi_1\rangle|1\rangle = -|\psi_1\rangle|1\rangle$$

$$S_1|\psi_0\rangle|0\rangle = |\psi_0\rangle|0\rangle$$

$$S_0|0|_n|0\rangle = -|0\rangle_n|0\rangle$$

The operator Q is applied $M=2^m$ times to the state $|0\rangle_{n+1}$, which can be proven to boost the probability to measure the state of interest $|\psi_1\rangle$. The amplitude $\tilde{f}=\langle\psi_1|\psi_1\rangle$ is calculated as $\tilde{f}=\sin^2\theta_f$, $\theta_f\in[0,\pi/2]$ where $\theta_f$ is linked to the eigenvalues of the operator Q: $\lambda_\pm = e^{\pm i2\theta_f}$. After M applications of Q the state of the quantum system is $$Q^M A|0\rangle_{n+1} = \frac{1}{\sqrt{1-f}}\cos((2M+1)\theta_f)|\psi_0\rangle|0\rangle + \frac{1}{\sqrt{f}}\sin((2M+1)\theta_f)|\psi_1\rangle|1\rangle$$

The final measurement may produce the state $|\psi_1\rangle$ (measuring $|1\rangle$ in the last qubit) with probability equal to $\sin^2((2M+1)\theta_f)$.

Such algorithms allow for quantum realization of both the sampling schema, as well as the pricing function itself.

With the input, A circuit prepares the input state $A|0\rangle_{n+1} = \alpha|\psi_0\rangle|0\rangle + \beta|\psi_1\rangle|1\rangle$, where $\alpha=\sqrt{1-f}$, $\beta=\sqrt{f}$, and $\psi_0$, $\psi_1$ are n-qubit normalized states. The amplitude $\tilde{f}=\langle_1|\psi_1\rangle$ may be calculated as $\tilde{f}=\sin^2\theta_f$, $\theta_f\in[0,\pi/2]$.

In the mean value estimation algorithm, the function $f$ of the pricing function is used to build the A circuit. The quantum equivalent of the pricing function may use a Taylor series expansion to support the two tenors.

As noted, either a quantum computer, utilizing the equations described above, and/or a classical computer may be utilized to determine an estimated value for the IRS.

As described above, example embodiments provide methods and apparatuses that enable improved valuation of interest rate swap transactions. Example embodiments thus provide tools that overcome the problems faced by running such valuations solely on a classic computing device. Moreover, embodiments described herein avoid high sample and high error rate simulations that run at a slower rate than a quantum computer.

As these examples all illustrate, example embodiments contemplated herein provide technical solutions that solve real-world problems faced during valuation of large amounts of financial transactions, particularly interest rate swap transactions.

FIG. 6 illustrates a flowchart describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for valuing one or more cash flow occurrences in an interest rate swap transaction, the method comprising:

estimating, by an interest rate swap (IRS) circuitry using an interest rate model, a mean interest rate for each tenor of one or more combinations of two or more tenors of an interest rate swap based on (a) each tenor's long term interest rate mean value, (b) each tenor's interest rate volatility represented by at least one underlying distribution, and (c) a first number of qubits for the distribution;

determining, by the IRS circuitry, a forward interest rate based on the mean interest rate of each tenor of the one or more combinations for the cash flow occurrences;

preparing, by a quantum computing device, a quantum mean estimation (QME) circuit comprising:
    a first quantum register and a second quantum register, the first quantum register comprising an ancilla qubit,
    an inverse quantum Fourier transform configured to operate on the second quantum register,
    a quantum amplitude estimation (QAE) circuit configured to operate on the first quantum register and the second quantum register, the QAE circuit comprising a unitary operator A comprising:
        a state preparation unit configured to encode the mean interest rate for each tenor of the one or more combinations using a quantum multiplexor circuit on the first quantum register; and
        a quantum pricing function encoding an IRS pricing function based on (a) the mean interest rate for each tenor of one of the one or more combinations and (b) the forward interest rate of the one or more combinations, the quantum pricing function configured to transform a result of the state preparation unit and the ancilla qubit on the first quantum register, and
    a quantum Fourier transform configured to operate on the second quantum register;

determining, by the QME circuit of the quantum computing device, an estimate value, a standard deviation of the estimate value, and an outcome associated with the estimate value; and determining, by the IRS circuitry, an overall value of the interest rate swap based on one or more determinations of estimate value, standard deviation of the estimate value, and outcome associated with the estimate value corresponding to each of the one or more combinations.

2. The method of claim 1, wherein the interest rate model comprises a plurality of simulation techniques.

3. The method of claim 2, wherein one or more of the plurality of simulation techniques generates the overall value using a quantum computer.

4. The method of claim 2, wherein one or more of the plurality of simulation techniques includes a Monte Carlo simulation.

5. The method of claim 2, wherein the plurality of simulation techniques are executed on one or more of a quantum computer or a classical computer.

6. The method of claim 5, further comprising:
receiving, by an input-output circuitry, parameters for the plurality of simulation techniques, wherein the parameters include a selection of a type of computer; and
prior to estimation of the mean interest rate, transmitting the parameters to the selection, wherein estimations and determinations by the IRS circuitry are executed on the selection of the type of computer.

7. The method of claim 6, wherein the type of computer includes one or more of a combination of the quantum computer and the classical computer.

8. The method of claim 6, wherein the parameters include one or more of a type of distribution, a number of periods, a number of qubits, a type of measurement, or q shots.

9. The method of claim 8, wherein the estimations and determinations by the IRS circuitry are initiated by one of user input or upon reception of the parameters.

10. The method of claim 9, further comprising:
generating, by the input-output circuitry, a user interface configured to accept the parameters and initiate the estimations and determinations by the IRS circuitry.

11. The method of claim 1, wherein the interest rate model comprises one or more of a machine learning or statistical model.

12. The method of claim 1, further comprising: generating, by the IRS circuitry, an output file in a readable format including one or more of the overall value of (1) the interest rate swap, (2) the one or more determinations of estimate value, (3) standard deviation of the estimate value, and (4) outcome associated with the estimate value corresponding to each of the one or more combination.

13. An apparatus for valuing one or more cash flow occurrences in an interest rate swap transaction, the apparatus comprising:
an interest rate swap (IRS) circuitry configured to:
    estimate, using an interest rate model, a mean interest rate for each tenor of one or more combinations of two or more tenors of an interest rate swap based on (a) each tenor's long term interest rate mean value, (b) each tenor's interest rate volatility represented by at least one underlying distribution, and (c) a first number of qubits for the distribution; distribution, and
    determine a forward interest rate based on the mean interest rate of each tenor of the one or more combinations for the cash flow occurrences; and
a quantum computing device configured to:
    prepare a quantum mean estimation (QME) circuit comprising:
        a first quantum register and a second quantum register, the first quantum register comprising an ancilla qubit;
        an inverse quantum Fourier transform configured to operate on the second quantum register;
        a quantum amplitude estimation (QAE) circuit configured to operate on the first quantum register and the second quantum register, the QAE circuit comprising a unitary operator A comprising:
            a state preparation unit configured to encode the mean interest rate for each tenor of the one or more combinations using a quantum multiplexor circuit, and
            a quantum pricing function encoding an IRS pricing function based on (a) the mean interest rate for each tenor of one of the one or more combinations and (b) the forward interest rate of the one or more combinations, the quantum pricing function configured to transform a result of the state preparation unit and the ancilla qubit on the first quantum register; and
        a quantum Fourier transform configured to operate on the second quantum register and
    determine, by the QME circuit, an estimate value, a standard deviation of the estimate value, and an outcome associated with the estimate value;
wherein the IRS circuitry is further configured to determine an overall value of the interest rate swap based on one or more determinations of estimate value, standard deviation of the estimate value, and outcome associated with the estimate value associated with each of the one or more combinations.

14. The apparatus of claim 13, wherein one or more of a quantum computer or classical computer generate and execute the interest rate model.

15. The apparatus of claim 14, wherein execution of the interest rate model is based on parameters received by the IRS circuitry.

16. The apparatus of claim 13, wherein the IRS circuitry is configured to generate a recommendation based on the overall value of the interest rate swap.

17. The apparatus of claim 16, wherein the recommendation comprises an indication of whether to execute one or more interest rate swaps.

18. A computer program product for valuing one or more cash flow occurrences in an interest rate swap transaction, the computer program product comprising at least one non-transitory computer-readable storage medium storing software instructions that, when executed, cause an apparatus to:
  estimate a mean interest rate for each tenor of one or more combinations of two or more tenors of an interest rate swap based on (a) each tenor's long term interest rate mean value, (b) each tenor's interest rate volatility represented by at least one underlying distribution, and (c) a first number of qubits for the distribution;
  determine a forward interest rate based on the mean interest rate of each tenor of the one or more combinations for the cash flow occurrences;
  prepare a quantum mean estimation (QME) circuit comprising:
    a first quantum register and a second quantum register, the first quantum register comprising an ancilla qubit,
    an inverse quantum Fourier transform configured to operate on the second quantum register,
    a quantum amplitude estimation (QAE) circuit configured to operate on the first quantum register and the second quantum register, the QAE circuit comprising a unitary operator A comprising:
      a state preparation unit configured to encode the mean interest rate for each tenor of the one or more combinations using a quantum multiplexor circuit; and
      a quantum pricing function encoding an IRS pricing function based on (a) the mean interest rate for each tenor of one of the one or more combinations and (b) the forward interest rate of the one or more combinations, the quantum pricing function configured to transform a result of the state preparation unit and the ancilla qubit on the first quantum register, and
    a quantum Fourier transform configured to operate on the second quantum register;
  determining, by the QME circuit, an estimate value, a standard deviation of the estimate value, and an outcome associated with the estimate value; and
  determine an overall value of the interest rate swap based on one or more determinations of estimate value, standard deviation of the estimate value, and outcome associated with the estimate value associated with each of the one or more combinations.

19. The computer program product of claim 18, wherein executed instructions cause the apparatus to generate a report including one or more of the overall value of the interest rate swap, a recommendation, the estimate value, standard deviation of the estimate value, or outcome associated with the estimate value.

20. The computer program product of claim 19, wherein the recommendation is based on the overall value of the interest rate swap, the estimate value, standard deviation of the estimate value, and outcome associated with the estimate value, and wherein the recommendation includes an indication of risk associated with executing the interest rate swap.

* * * * *